March 15, 1927.

R. C. ALLEN

TURBINE VALVE

Filed Nov. 5, 1923

1,620,624

WITNESSES:

R. C. Allen
INVENTOR

BY
ATTORNEY

Patented Mar. 15, 1927.

1,620,624

UNITED STATES PATENT OFFICE

ROBERT C. ALLEN, OF ESSINGTON, PENNSYLVANIA, ASSIGNOR TO WESTINGHOUSE ELECTRIC AND MANUFACTURING COMPANY, A CORPORATION OF PENNSYLVANIA.

TURBINE VALVE.

Application filed November 5, 1923. Serial No. 673,033.

My invention relates to an operating mechanism for turbine control valves and it has for its object to provide apparatus of the character designated which shall be operative not only to open and to close the valves in a predetermined sequence but, in the event of any valve sticking, either in the opening or the closing operation, to apply a positive force thereto for more reliable working.

Figure 1:
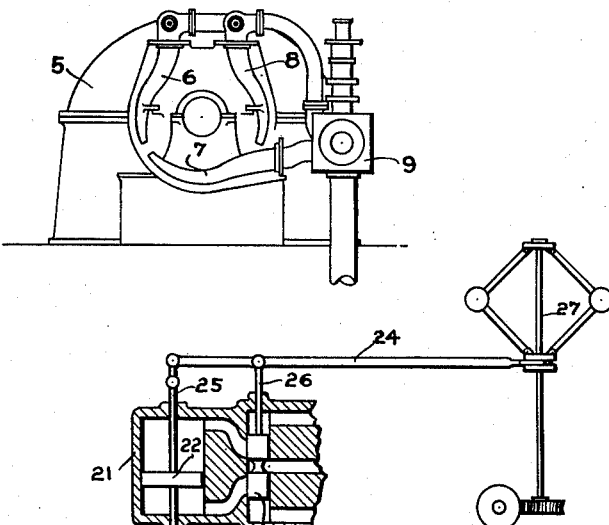
Figure 2:
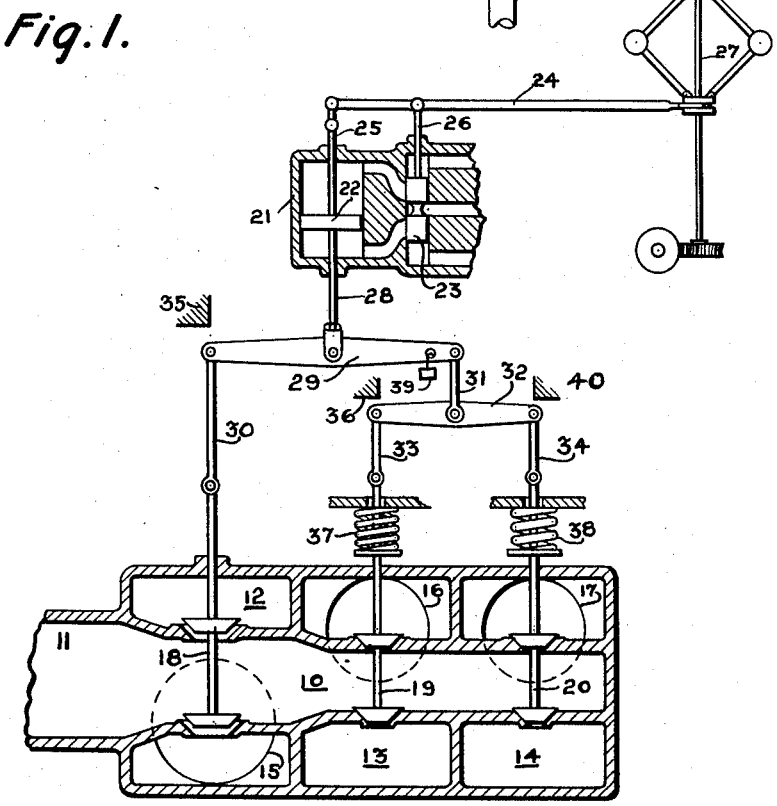

In the accompanying drawing, Fig. 1 is an end view, in elevation, of a turbine, together with three nozzle blocks and a steam chest arranged to employ my invention; and Fig. 2 is a side view, partially diagrammatic and partially in section, illustrating a preferred form of my invention.

In the operation of fluid-pressure turbines under varying load conditions, it is a common practice to employ a plurality of nozzle blocks, each nozzle block or nozzle group having its appropriate control valve admitting steam from a suitable steam chest. It is customary to operate these valves in a predetermined sequence, either by hand or by an automatic device, such as a speed-responsive governor, upon an increase in load and to close said valves in the reverse sequence upon a decrease in the load. Apparatus of this general character is illustrated on page 611 of the Journal of the Institution of Electrical Engineers, for June, 1921, published by Spon, Limited, 57 Haymarket, London, S. W. 1, England, and in the apparatus there illustrated the opening of the primary valve by a moving piston against the action of a closing spring eventually brought about the opening of the secondary and of the tertiary valves against the action of closing springs. The closing action, however, is entirely dependent upon said closing springs and hence is not at all times effective, since a given valve or valve stem may stick and remain open with consequent undesirable results.

In accordance with the present invention, I employ a double-acting motor mechanism, together with means whereby a positive opening force from said mechanism is applied to each valve for the opening thereof and a similar positive closing action is applied to each valve for the closure thereof, thus largely eliminating the possibility of sticking.

Referring to the accompanying drawing for a more detailed understanding of my invention, I show a turbine casing of any desired nature at 5 in Fig. 1, this casing carrying three nozzle blocks 6, 7 and 8, drawing steam from a steam chest 9 through suitable conduits, all as is well-known and understood in the art. The steam chest 9 is shown in cross section in Fig. 2 and embodies a central steam chamber 10 to which steam is admitted from a conduit 11, the chamber 10 being surrounded by three annular chambers 12, 13 and 14. Conduits 15, 16 and 17 lead steam from these chambers respectively to the respective nozzle blocks.

A valve 18 controls the admission of steam from the space 10 to the space 12, and similarly a valve 19 controls the admission of steam from the space 10 to the space 13, and a valve 20 from the space 10 to the space 14.

The valves are operated by any suitable motor mechanism, such, for example, as a fluid-pressure cylinder 21 containing a piston 22, fluid-admission and release therefrom being controlled as by a pilot valve 23, as is well-known and understood in the art. A floating lever 24 is pivoted to an upward extension 25 from the piston 22, to an extension 26 from the pilot valve 23 and to a suitable governor mechanism shown more or less diagrammatically at 27.

The main piston rod 28 carried by the piston 22 is pivoted at an intermediate point to a whiffle-tree or equalizing lever 29, the left-hand end of which is connected by a link 30 to the stem of the valve 18. A link 31 depends from the right-hand end of the lever 29 and carries an additional whiffle-tree or equalizing lever 32, the left-hand end of which is connected to the stem of the valve 19 as by a link 33, while the right-hand end thereof is connected to the stem of the valve 20 as by a link 34.

A fixed stop member 35 is disposed above the left-hand end of the link 29 to prevent further movement thereof when the primary valve 18 is fully opened and, similarly, a fixed stop member 36 is disposed adjacent the left-hand end of the lever 32 to prevent further movement of said end of said lever when the secondary valve 19 is fully opened. A stop 40 is located above the right-hand end of the lever 32 to prevent further movement of the valve 20 when it is fully opened.

A relatively light spring 37 is arranged to develop a closing force upon the secondary valve 19 and a relatively heavy spring 38 is arranged to apply a similar force to the tertiary valve 20. Although not shown, if desired, a spring may be arranged to exert a closing force on the valve 18. This would also serve to take up lost motion in the linkage. A counterweight 39 may be mounted upon the right-hand end of the lever 29 for a purpose to be hereinafter more fully pointed out.

Having thus described the structure of apparatus embodying my invention, the operation thereof is as follows:

Assuming the turbine to be running under relatively light load, the primary valve 18 alone is open, the springs 37 and 38 retaining the secondary and tertiary valves 19 and 20 in the closed position and causing the right-hand end of the lever 29 to be virtually a fixed fulcrum. Slight variations in the light load upon the turbine cause slight raising and lowering of the piston 22 by the governor 27 through the relay mechanism 23, as is well-known and understood.

Assuming now a radical increase in the load, the piston 22 rises until the valve 18 is fully open and the stop 35 is encountered. Under these conditions, the left-hand end of the lever 29 becomes the fulcrum, and the effect of the piston 22 upon further rise is to raise the right-hand end of the lever 29 which now ceases to act as a fulcrum. The spring 37 being relatively light with respect to the spring 38, the lifting of the link 31 raises the left-hand end of the link 32, opening the valve 19 while the right-hand end of the link 32 acts as a fulcrum. Assuming the new load to continue for a time with slight fluctuations, it will be noted that the linkage continues to function as shown, the point 35 and the right-hand end of the lever 32 acting as fulcrums, the primary valve remaining fully open, and all necessary steam control being effected by the secondary valve 19.

Assuming a still further increase in the load, the secondary valve 19 is fully opened and the left-hand end of the lever 32 encounters the stop 36, thus causing this to become a fulcrum point and causing the right-hand end of the lever 32 to move in response to the control mechanism, opening the tertiary valve 20 to the desired amount. Subsequent small load fluctuations under the heavy load condition cause the control effect of the mechanism 21 to be applied solely to the tertiary valve 20, the primary and secondary valves remaining fully open.

The function of the counterweight 39 is to aid the springs 37 and 38 in furnishing the primary fulcrum for the initial opening of the primary valve.

The reverse operation upon a decrease in the turbine load will be obvious from the foregoing description, the tertiary valve 20 first closing and the fluctuations being cared for by the secondary valve, said valve then closing and throwing the entire control function upon the primary valve.

Passing now to what may be termed abnormal conditions of operation, let it be assumed that the primary valve sticks in the closed position. A rise of the piston 22 then raises the link 31 without the intervention of the stop 35 and this opens the secondary and, if necessary, the tertiary valves in an attempt to carry the load, even although the primary valve remains closed. Similarly, assuming the primary valve to open and the secondary valve to stick, the stop 36 is not encountered, but the link 34 rises, until the right-hand end of the lever 32 comes in contact with the stop 40, opening the tertiary valve. The right-hand end of the lever 32 now becomes a fulcrum, causing the left-hand end to move in response to the control mechanism, opening the secondary valve 19.

Similarly, on closing, let it be assumed that the tertiary valve 20 sticks in the open position. The right-hand end of the lever 32 then becomes a fulcrum, causing an earlier closure of the secondary valve 19 than would otherwise have been the case, and also permitting an earlier closure of the primary valve 18 than would otherwise have been the case. Similarly, should the tertiary valve 20 close and the secondary valve 19 stick in an open position, the primary valve 18 would close sooner than would otherwise be the case.

It should be particularly noted that should any two valves close and the remaining valve stick open, further closing action by the piston 22 results in the imposition of a direct closing force upon the defective valve, this force being of any desired magnitude as determined by the design of the apparatus and not being derived from springs or their equivalents.

While I have shown my invention as applied to a control aggregate employing three valve units, it will be obvious that it is susceptible of application in a similar manner to any desired number of valve units. Furthermore, the specific control element need not be a governor as shown, but may, for example, be the pressure in a bleeder line, or any other desired controlling function and I do not deem it necessary to illustrate such other form of control element for the reason that it forms no part of the present invention. If desired, the control element may act directly upon the lever 29 rather than through the interposition of the fluid pressure relay and power cylinder, as shown, but this also is a modification forming no part of the present invention.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a control mechanism for fluid-pressure turbines embodying a plurality of nozzle groups and a corresponding number of control valves, a motor device for opening and closing said valves, and linkage means for applying all the force of said motor device to each of said valves in succession for the opening thereof in a predetermined sequence and for applying the force of said motor device to each of said valves in succession in the reverse sequence for the closing thereof, said linkage means comprising a plurality of interconnecting links and having pivotal connection with the motor device and each of the valves.

2. In a control mechanism for fluid-pressure turbines embodying a plurality of nozzle groups and a corresponding number of control valves, a motor device, under control of the turbine speed, for opening and closing said valves, and linkage means for applying all the force of said motor device to each of said valves in succession for the opening thereof in a predetermined sequence and for applying the force of said motor device to each of said valves in succession in the reverse sequence for the closing thereof, said linkage means comprising a plurality of interconnecting links and having pivotal connection with the motor device and each of the valves.

3. In a control mechanism for fluid-pressure turbines embodying a plurality of nozzle groups and a corresponding number of control valves, a motor device under control of the turbine speed, and linkage means for the closure of said valves by said motor device, the closure of any valve establishing a fulcrum point in said linkage for definitely applying closing force to at least one other valve which may still be open.

4. The combination with a fluid-pressure turbine embodying primary, secondary and tertiary control valves, of an operating device for said valves, said device operating upon said valves through a linkage such that during the opening operation, the sticking of any valve causes an increased opening of the remaining valves for a given position of the operating device and such that, during the closing operation, the sticking of any one valve causes an increased closure of the remaining valves for a given position of the operating device.

5. The combination with a fluid-pressure turbine embodying primary, secondary and tertiary control valves, of an operating device for said valves, said device operating upon said valves through a linkage such that, during the opening operation, the full opening of any two valves imposes the full opening tendency on the third valve, and during the closing operation, the full closure of any two valves imposes the full closing tendency upon the third valve.

6. The combination with a fluid-pressure turbine embodying primary, secondary and tertiary nozzle groups and with primary, secondary and tertiary control valves associated therewith, respectively, of means for developing a force for the operation of said valves under the control of the turbine speed, a relatively light spring tending to close the secondary valve, a relatively heavy spring tending to close the tertiary valve, a floating link connected at its ends to the stems of the secondary and tertiary valves respectively, an additional floating link connected at one end to the stem of the primary valve, and at its other end to an intermediate point in said first named link, means for applying said operating force to an intermediate point in said second link, a fixed stop member disposed to arrest motion of the primary valve stem when fully open, and an additional stop member disposed to arrest motion of the secondary valve stem when fully open.

7. A valve mechanism comprising a plurality of valves, a link connected to said valves, a motor device connected to said link for opening and closing said valves, and means for limiting opening movement of one of said valves and constituting a fulcrum for the link so that the full force of said motor will be applied to at least one other valve.

8. A valve mechanism comprising a primary valve and a secondary valve, a link having pivotal connection with the primary valve at one end and with the secondary valve at the other end, a motor device pivotally connected to the link intermediate the ends thereof, and means for limiting opening movement of the primary valve end of the link and constituting a fulcrum for the link whereby further force of the motor device is transmitted to the secondary valve.

9. A valve mechanism comprising a plurality of valves, a link connected to said valves, valve operating means connected to said link for opening and closing said valves, and means for limiting opening movement of one of said valves and constituting a fulcrum for the link so that the full force of said valve operating means will be applied to at least one other valve.

10. A valve mechanism comprising a primary valve and a secondary valve, a link having pivotal connection with the primary valve at one end and with the secondary valve at the other end, valve operating means pivotally connected to the link intermediate the ends thereof, and means for limiting opening movement of the primary valve end of the link and constituting a fulcrum for the link whereby further force of the valve operating means is transmitted to the secondary valve.

In testimony whereof, I have hereunto subscribed my name this 29th day of October, 1923.

ROBERT C. ALLEN.